(12) United States Patent
Amara et al.

(10) Patent No.: US 7,010,047 B2
(45) Date of Patent: Mar. 7, 2006

(54) GLOBAL BRIGHTNESS CHANGE COMPENSATION SYSTEM AND METHOD

(75) Inventors: Foued Ben Amara, Vancouver (CA); James Au, Port Coquitlam (CA); Faouzi Kossentini, Vancouver (CA)

(73) Assignee: UB Video Inc., Vancouver (CA)

( * ) Notice: Subject to any disclaimer, the term of this patent is extended or adjusted under 35 U.S.C. 154(b) by 610 days.

(21) Appl. No.: 10/268,773

(22) Filed: Oct. 11, 2002

(65) Prior Publication Data

US 2004/0071210 A1  Apr. 15, 2004

(51) Int. Cl.
*H04N 7/12* (2006.01)

(52) U.S. Cl. .................. 375/240.29; 382/254; 348/687

(58) Field of Classification Search ........... 375/240.29, 375/240.15, 240.13, 240.12; 382/236, 224, 382/254; 348/687, 688, 701
See application file for complete search history.

(56) References Cited

U.S. PATENT DOCUMENTS

| | | | | |
|---|---|---|---|---|
| 5,311,310 A | * | 5/1994 | Jozawa et al. | ......... 375/240.13 |
| 5,544,239 A | * | 8/1996 | Golin et al. | ................ 382/236 |
| 5,799,111 A | * | 8/1998 | Guissin | ...................... 382/254 |
| 6,266,370 B1 | * | 7/2001 | Kamikura et al. | ..... 375/240.15 |
| 6,459,733 B1 | * | 10/2002 | Yokoyama et al. | .... 375/240.12 |
| 6,549,660 B1 | * | 4/2003 | Lipson et al. | ............... 382/224 |

* cited by examiner

*Primary Examiner*—Gims Philippe
(74) *Attorney, Agent, or Firm*—McCarthy Tétrault LLP

(57) ABSTRACT

A pre-processing system and method is used to compensate for global brightness changes in consecutive video frames. The system and method uses a brightness change model to identify the global brightness changes and to discard the brightness in a source frame so that the brightness changes between consecutive reconstructed video frames is kept to a minimum. The Hough Transform is used as one example of the model to accumulate votes for different values of brightness change model parameters. Compensation for any detected brightness changes in the source frame is performed with filtering of the model parameters when necessary, to help avoid any artifacts in the compensated source frame. Different application sequences of the brightness change model allows for multiple levels of processing delays.

22 Claims, 13 Drawing Sheets

GLOBAL BRIGHTNESS CHANGE COMPENSATION SYSTEM AND METHOD

BACKGROUND OF THE INVENTION

1. Field of the Invention

The present invention relates to a system and method for modifying brightness variations between image frames in digital video.

2. Description of the Prior Art

There is an increasing reliance on video data in rich media applications running on interconnected devices or systems such as personal computers, wireless devices, surveillance systems, video conferencing systems and set-top boxes. Video data compression systems play a key role in increasing the efficiency of video data transmission. Video data is compressed or coded for transmission by taking advantage of the spatial redundancies within a given frame and the temporal redundancies between successive frames. Intraframe compression operates on single frames independently of other frames to exploit spatial redundancies within the frame, whereas interframe compression exploits both spatial and temporal redundancies.

Video compression systems exploit temporal redundancies using interframe prediction coding. Interframe coding is based on predicting the current frame using the previously coded frame, and coding only the prediction error between the source frame and the predicted frame. Approximations are done in the prediction process, by assuming the motion is uniform across all pixels of each motion estimation block in each frame. It is noted that interceding can be done for both uni-directional and bi-directional prediction. Transmission efficiencies are realised in intercoding by transmitting the prediction error, as the amount of information present in the prediction error is generally less than that in the actual pixel values. However, brightness changes between successive video frames can degrade the efficiency of the intercoding process. The main reason for the performance degradation is that the motion prediction in interceding is based on the assumption that the moving object would have the same luminance values in two successive frames. When the luminance values change due to simply changes in brightness, the encoder interprets the changes as being due to motion. Consequently, the encoder would in that case work harder to estimate the perceived motion which could lead to a slowdown of the performance of the encoder. Moreover, the additional generated motion information could cause an increase in the bit rate and could also lead to the appearance of blocking artifacts. Therefore, brightness changes in successive video frames can have a detrimental effect on a number of video coding and video quality aspects.

For example, brightness changes could be due to changes in the camera exposure adjustment, lighting changes, transition fades, etc. In the case of video conferencing using a webcam, when a subject is very close to the camera, brightness changes occur often if the subject frequently moves close to and then away from the camera or moves across the field of view of the camera. These frequent changes in luminance values in video conferencing applications place an increasing demand on the motion estimation and compensation algorithms of the coding process. Also, given that video conferencing applications usually run at low bit rates, the increase in the number of bits required to code the video images due to the coding of the brightness changes would lead to a reduction in the quality of the video images. The latter is due to the fact that fewer bits would be available to accurately reproduce the details of the video images as compared to the case where no brightness changes take place.

A well-known contrast-change/brightness model has been proposed in the literature to describe brightness changes between successive frames. The model is given by $$I(x,y,t) = C \times I(x+\Delta x, y+\Delta y, t-1) + D,$$

where $I(x,y,t)$ is the luminance intensity of pixel $(x,y)$ at source frame $t$, $(\Delta x, \Delta y)$ is a motion vector for the pixel, $C$ is a contrast change, and $D$ is a brightness shift.

The above model has been applied in U.S. Pat. No. 6,266,370 to avoid as much as possible coding the brightness changes at the encoder level while at the same time allowing the decoder to reproduce the brightness changes in the decoded images. At the encoder side, the brightness change model parameters are estimated using the brightness level of each pixel in the source frame. When the estimates for the parameters $C$ and $D$ become available, and before the start of motion estimation, the encoder adjusted the brightness level in the reference frame using the estimated brightness change model to bring the brightness level in the stored reference frame closer to that of the source frame. The motion estimation is then performed on the brightness compensated reference frame. Consequently, the encoder does not have to encode the changes in the source frame that are due to brightness changes. The encoder also provided the decoder with the necessary information to reproduce the brightness level changes in the stored reference frame. The latter is achieved by sending the decoder the values of the parameters $C$ and $D$ that could be used to adjust the brightness level in the stored decoded frame as it was done in the encoder. Therefore, the viewer at the decoder side would still be able to notice the temporal variation in brightness as in the source video images, which is desirable in some applications such as in motion picture related applications, however, in other applications such as video conferencing, it is desirable to not have the temporal variation in brightness so that the viewer at the decoder side would not notice such variations. The method presented in U.S. Pat. No. 6,266,370 aims at preserving the temporal variations in brightness as opposed to maintaining the brightness level in the video images relatively constant.

It is an object of the present invention to provide a global brightness change compensation system and method to obviate or mitigate some of the above-presented disadvantages.

SUMMARY OF THE INVENTION

A pre-processing system and method is used to compensate for global brightness changes in consecutive video frames. The system and method uses a brightness change model to identify the global brightness changes and to adjust the brightness in a source frame so that the brightness changes between consecutive reconstructed video frames is kept to a minimum. The Hough Transform is used as one example of a method to identify the brightness change model parameters. Compensation for any detected brightness changes in the source frame is performed with filtering of the model parameters when necessary, to help avoid brightness artifacts in the compensated source frame. Different configurations involving the identification of the brightness change model parameters and the compensation of brightness changes allow for multiple levels of processing delays.

According to the present invention there is provided a pre-processing system for reducing identified brightness changes between a first video source frame and a subsequent second video source frame in a video frame sequence. The system comprises an input for the video frame sequence, the sequence including the second source frame having an array of second source pixels. The system also has a frame memory for containing a first brightness compensated frame representing a brightness compensated version of the first source frame, the first compensated frame having an array of brightness compensated first pixels. A brightness pre-processor has a brightness model with at least two model parameters for identifying a brightness variation between a selected group of the second source pixels and a corresponding selected group of the compensated pixels. The system uses a brightness filter for selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, thereby producing a second brightness compensated source frame. The reduction of the brightness variation between the second source frame and the first compensated frame provides the second brightness compensated source frame for input to an encoder.

According to a further aspect of the present invention there is provided a preprocessing method for reducing identified brightness changes between a first video source frame and a subsequent second video source frame in a video frame sequence, the method comprising:

a) receiving the video frame sequence, the sequence including the second source frame having an array of second source pixels;

b) storing a first brightness compensated frame representing a brightness compensated version of the first source frame, the first compensated frame having an array of brightness compensated first pixels;

c) pre-processing the second source frame using a brightness model with at least two model parameters to identify a brightness variation between a selected group of the second source pixels and a corresponding selected group of the compensated pixels;

d) identifying the brightness of the second source frame by selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, and e) producing a second brightness compensated source frame by applying the brightness offset to the second source frame;

wherein the reduction of the brightness variation between the second source frame and the first compensated frame provides the second brightness compensated source frame for input to an encoder.

According to a still further aspect of the present invention there is provided a computer program product for video frame pre-processing to reduce identified brightness changes between a first video source frame and a subsequent second video source frame in a video frame sequence, the computer program product comprising:

a) a computer readable medium;

b) an input module stored on the computer readable medium for storing the video frame sequence, the sequence including the second source frame having an array of second source pixels;

c) a frame memory module coupled to the input module, the memory module for containing a first brightness compensated frame representing a brightness compensated version of the first source frame, the first compensated frame having an array of brightness compensated first pixels;

d) a brightness pre-processor module coupled to the frame module, the pre-processor module having a brightness model with at least two model parameters for identifying a brightness variation between a selected group of the second source pixels and a corresponding selected group of the compensated pixels;

e) a brightness filter module coupled to the pre-processor module, the filter module for selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, thereby producing a second brightness compensated source frame;

wherein the reduction of the brightness variation between the second source frame and the first compensated frame provides the second brightness compensated source frame for input to an encoder.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
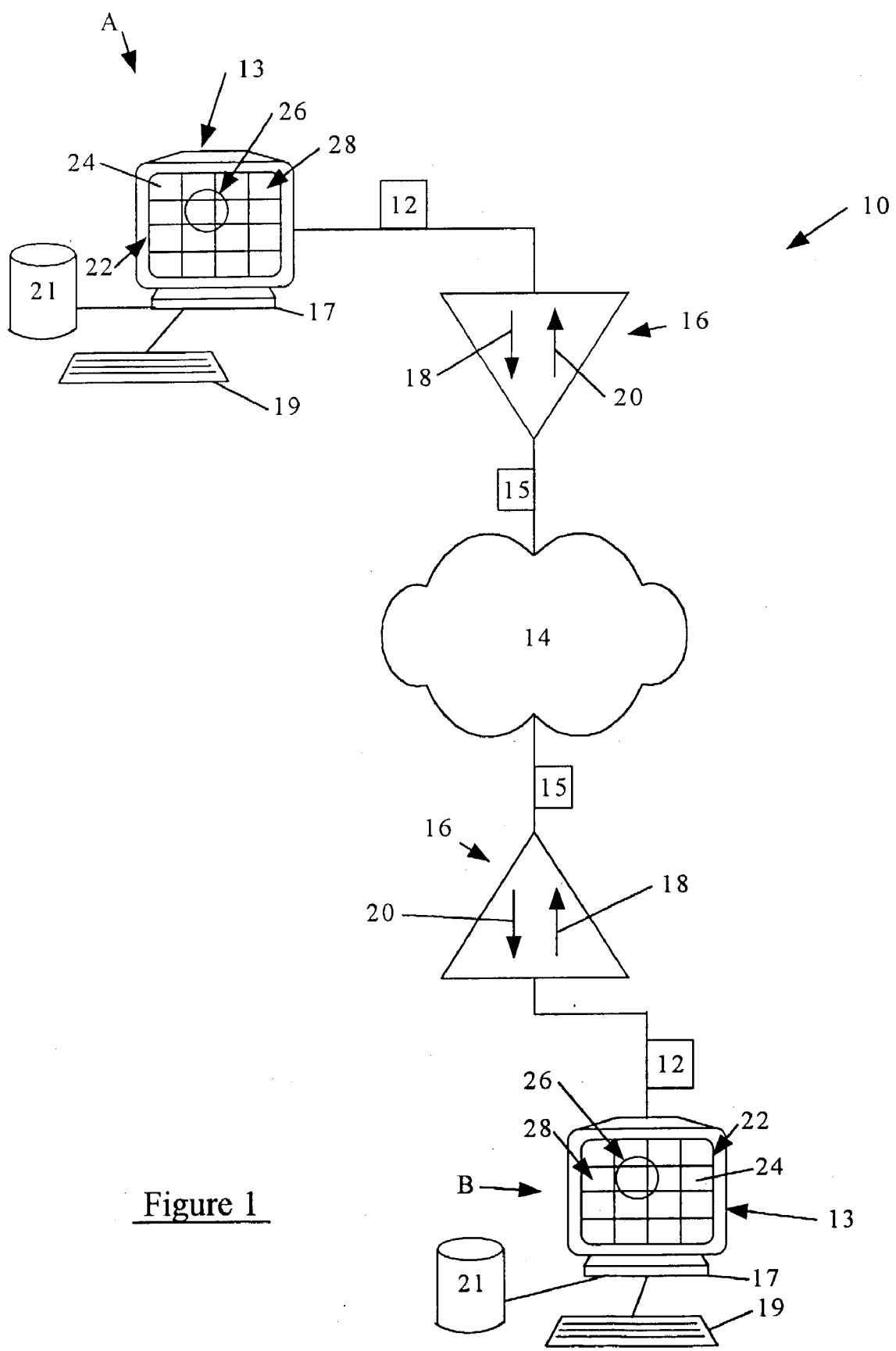
FIG. 1 is a diagram of a video conferencing system 10.

Referring to FIG. 1, a video conferencing system 10 has participants A and B that exchange video data 12 between monitors 13, formatted as a compressed bit stream 15 over a network 14 (such as but not limited to the Internet). Each participant A, B has a video processor 16 having an encoder 18 for encoding transmitted video data 12 and a decoder 20 for decoding the received bit stream 15. Each image frame 22 displayed on the monitors 13 is made of a series of blocks 24, such as but not limited to a block of 16×16 pixels, representing an object 26 which moves over a background 28 (for example a person giving a presentation while standing in front of a backdrop). Accordingly, the processors 16 coordinate the display of successive frames 22 on the monitors 13, as the video data 12 is communicated between the participants A, B during a video conferencing session.

The video data 12 is a temporal sequence of pictures, each referred to as the frame 22. Each frame 22 is composed of three images; one red (R), one green (G), and one blue (B). However, for compatibility with non-coloured media, the RGB model is represented as an equivalent YcbCr model, where Y is a luminance (luma) component, and Cb and Cr are chrominance (chroma) components, such that typically Y=0.299R+0.587G+0.114B, Cb=B−Y, and Cr=R−Y. Therefore, each frame 22 of the video data 12 is generically referred to as containing one luma image, one Cb chroma image, and one Cr chroma image. Standard formats have 8 bits per pixel to digitally represent each of the three components, where Cb and Cr images are typically downsampled by 2 in each dimension due to the sensitivity of human vision. Each frame 22 of the video data 12 is typically made up of blocks 24 (see FIG. 2) consisting of a grouping of pixels, such as a 16×16 luma block with the two associated 8×8 chroma blocks, which are processed and compressed for transmission as the bit stream 15 over the network 14.

Referring again to FIG. 1, the system 10 can also include a system processor 17. The processor 17 is coupled to the monitor 13 and to a user input device 19, such as a keyboard, mouse, or other suitable device. If the monitor 13 is touch sensitive, then the monitor 13 itself can be employed as the user input device 19. A computer readable storage medium 21 is coupled to the processor 17 for providing instructions to the processor 17 to instruct and/or configure the operation of the monitor 13, the video processor 16, and other parts of the system 10 used to encode/decode the video data 15/bit stream 15 over the network 14. The computer readable medium 21 can include hardware and/or software such as, by way of example only, magnetic disks, magnetic tape, optically readable medium such as CD ROM's, and semiconductor memory such as PCMCIA cards. In each case, the medium 21 may take the form of a portable item such as a small disk, floppy diskette, cassette, or it may take the form of a relatively large or immobile item such as hard disk drive, solid state memory card, or RAM coupled to the processor 17. It should be noted that the above listed example mediums 21 can be used either alone or in combination. Accordingly, a global brightness change compensation algorithm, as further defined below, can be implemented by the system 10 to minimise brightness changes in successive video frames 22. The algorithm can be used to help maintain a similar brightness level between successive video frames 22 of the video data 12, which could be useful in applications such as video conferencing where it is usually not desirable to code brightness changes.

Figure 2:
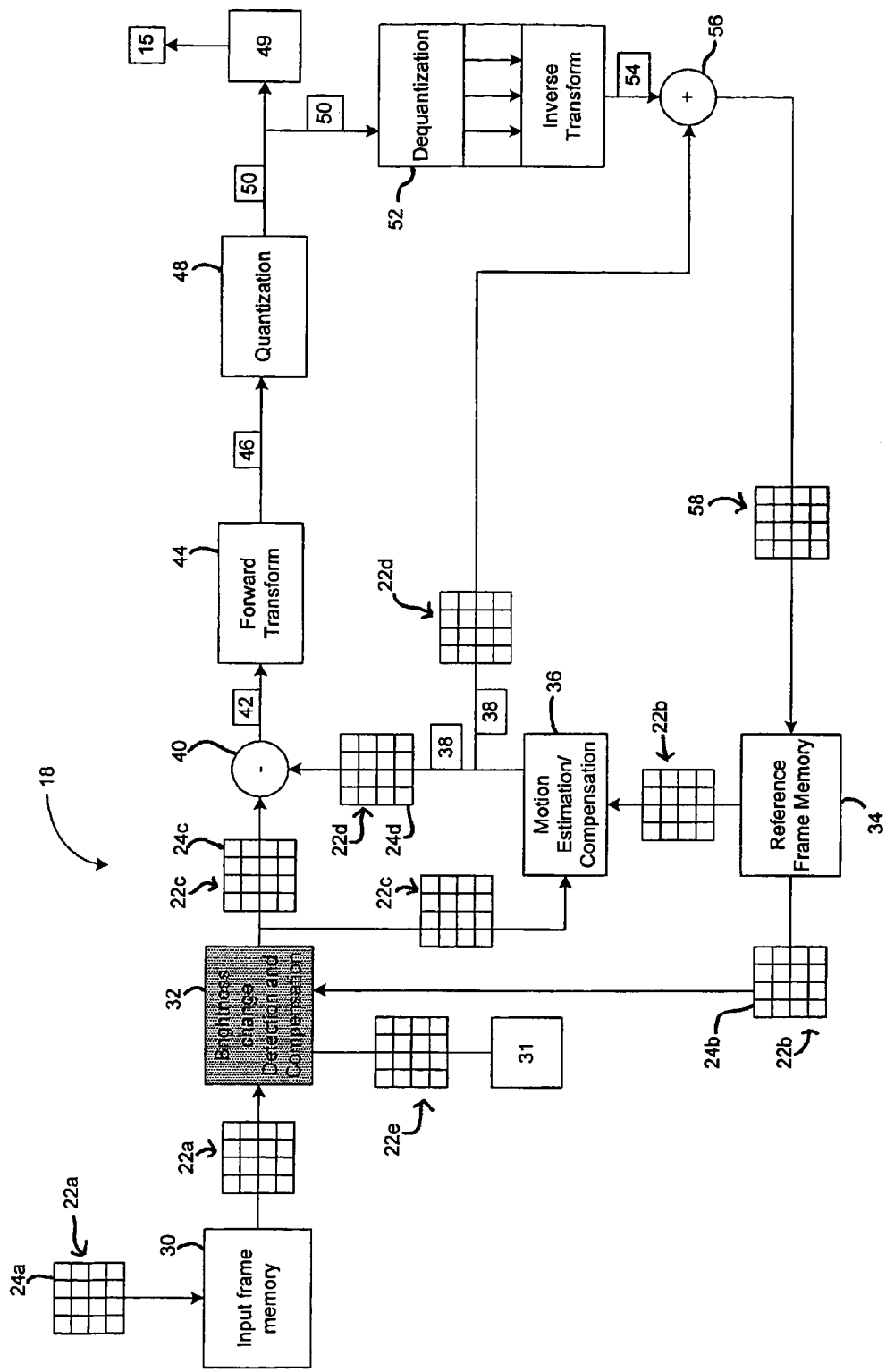
FIG. 2 is an encoder from the system of FIG. 1.

Referring to FIG. 2, the encoder 18 of the system 10 has an input frame memory 30, for receiving an Nth or source frame 22a (a sequence of source blocks 24a) in the video data 12 from the participants A, B (see FIG. 1). A reference frame memory 34 stores an (N−1)th or reference frame 22b, typically as a sequence of blocks 24b. It should be noted that the reference frame 22b is a coded brightness compensated (N−1)th source frame. Further, a brightness compensated source frame memory 31 stores an (N−1)th brightness compensated source frame 22e, typically as a sequence of blocks 24e. Each block 22a of the source frame 22a is first input into a brightness detection/compensation section 32 to produce a brightness compensated block 24c of a compensated frame 22c. The compensation section 32 is used to identify and compensate for global brightness changes such that the brightness changes between consecutive reconstructed versions of the video source frames 22a are kept to a minimum, as further explained below. It should be noted that the source frame 22a, representing the Nth source frame, is compensated by the section 32 in comparison to either the (N−1)th compensated source frame 22e or the (N−1)th reference frame 22b. Accordingly, for the following, the use of the reference frame 22b or the (N−1)th brightness compensated source frame 22e are interchangeable when used as the (N−1)th frame by the compensation section 32. Therefore, the frame 22e represents the first source frame and the source frame 22a represents the subsequent second source frame in a video frame sequence. It is recognised that the reference frame 22b may contain artifacts introduced by the reconstruction process.

The compensated frame 22c and the reference frame 22b are then used by a motion detection/compensation section 36 to find, for intercoding each block 24c of interest in the compensated frame 22c, a best matching block taken from the blocks 24b in the reference frame 22b, such that temporal redundancies in the video data 12 are exploited for compression purposes. The matching block can be defined as the reference block 24b that minimises prediction error within a search area of the reference frame 22b. This matching process is done by the motion section 36 by determining movement of the object 26 (and of the background 28 if present, see FIG. 1) for a selected compensation block 24c, with respect to each reference block 24b from the frame 22b, by means of a block matching method as is known in the art. A predicted frame 22d is assembled by the motion section 36 to consist of matched blocks taken from the reference frame 22b, which correspond to the compensated blocks 24c originally obtained from the source blocks 24a. The motion section 36 also computes a displacement/motion vector 38 for representing temporal differences corresponding to each block 24d. A subtractor 40 computes the prediction error 42 between the compensated blocks 24c and the predicted blocks 24d, and passes the prediction error 42 to a transform section 44 for applying a forward transform, such as for example the discrete cosine transform (DCT). It is noted for intracoded blocks 22a that; the forward transform is applied directly to the block 24c or to the prediction error block obtained by subtracting the source block 24c from its intra prediction. In this case, no displacement/motion vectors 38 would be needed.

The transform section 44 applies the frequency domain transform to the error 42 to produce a set of transform coefficients 46 representing the error 42. A quantization section 48 quantizes the set of transform coefficients 46 to produce a set of quantized coefficients 50, which are combined by an entropy coding section 49 with the motion vectors 38 and other encoder information to produce the compressed or encoded bit stream 15. The decoder 20 (see FIG. 1) of the receiving participant A,B processes the received bit stream 15 and then reconstructs the compensated frame 22c, using a stored copy of the reference frame 22b, the transmitted motion vectors 38, and the decompressed or reassembled prediction error 54 contained in the bit stream 15. It is recognised that the motion vectors 38 are not operated on by the transform 44 and quantization 48 sections, but are included by the coding section 49 with the quantized coefficients 50 to assemble the bit stream 15.

For both interceded and intracoded blocks, the quantized coefficients 50 are sent to a dequantization-inverse transform section 52 of the encoder 18, to produce the reconstructed prediction error 54. An adder 56 then adds the predicted frame 22d with the error 54 to produce a new Nth reference frame 58 to be stored in the memory 32 for subsequent encoding of the next (N+1)th source frame (not shown). The encoder 18 (see FIG. 1) emulates the behaviour of the decoder 20 for coded blocks 22 (except for decoding the entropy coded information) to make sure the encoder 18 of the transmitting participant A,B and the decoder 20 of the receiving participant A,B work from the same reference frames 22b. It should be noted in the encoder 18 of FIG. 2 that the motion section 36 uses the brightness compensated blocks 24c to represent the Nth source frame 22a, and the memory 34 stores reconstructed brightness compensated blocks to represent the reconstructed Nth reference frame 58. Accordingly, the brightness compensation section 32 is used as a pre-processor to remove or otherwise minimise brightness changes in successive reconstructed versions of the video source frames 22a.

Figure 3:
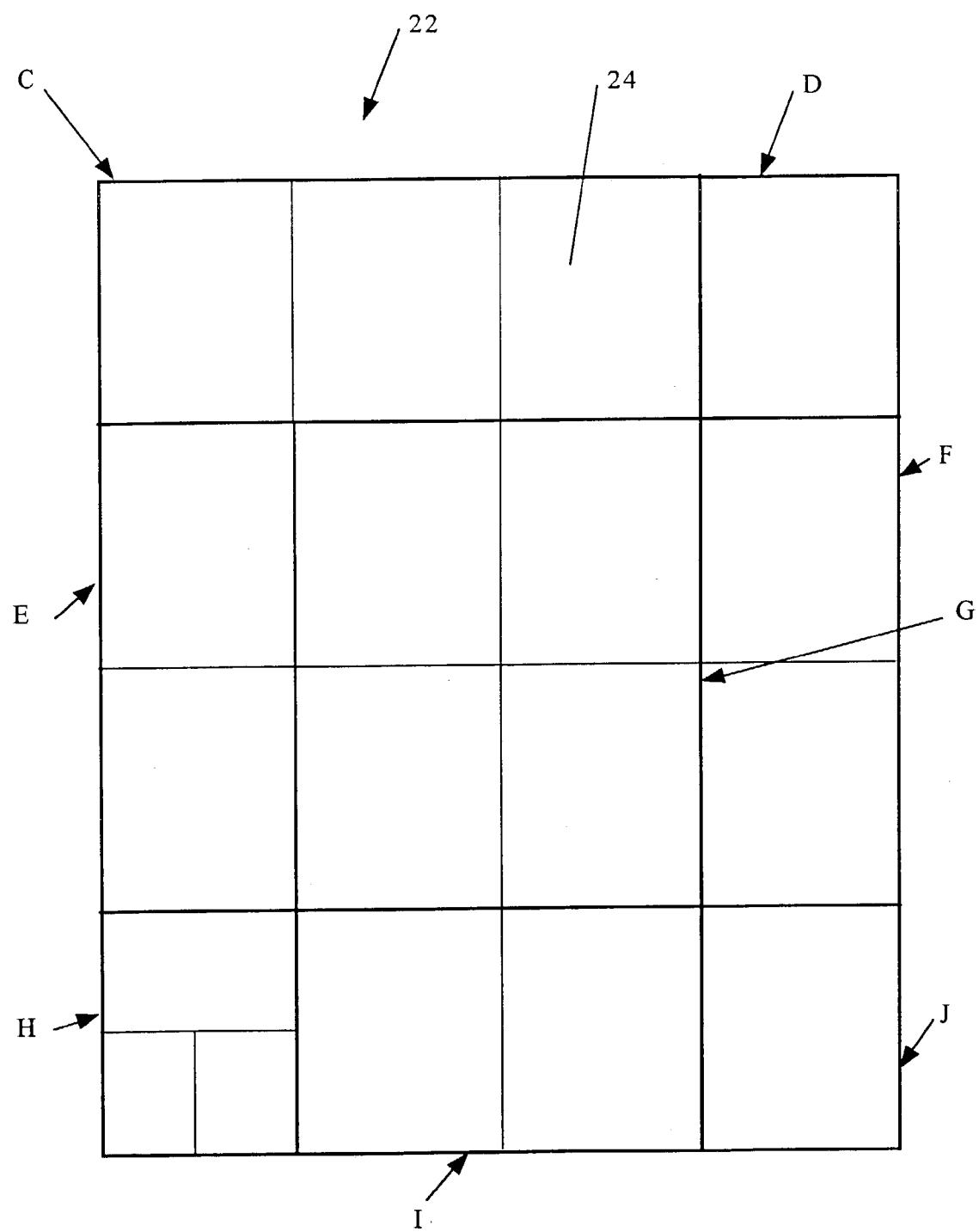
FIG. 3 is a divided frame of the system of FIG. 1.

Referring to FIG. 3, the compensation section 32 can use a divided frame 22 to perform the global brightness change compensation. The frame 22 is divided into voting sections (VS) C,D,E,F,G,H,I,J, which are further subdivided into voting blocks (VB) 24. For example, the voting section G is divided into four voting blocks 24 and the voting section C is divided into three voting blocks 24. The voting section VS could for example be the whole frame 22, a slice in the frame 22, or any contiguous selected grouping of macroblocks 24 such as one voting section VS per block 24. The size of the voting blocks 24 could vary within a voting section VS, and also from one voting section VS to another. For example, the voting section J contains one 16×16 voting block 24, while the voting section H contains one 4×8 voting block 24 and two 4×4 voting blocks 24. It should be noted in FIG. 3 that the thicker lined border of the voting sections VS can overlap the thinner lined borders of the blocks 24.

Referring to FIG. 2, it is further recognised that the motion estimation and compensation performed by the compensation section 36 is based on dividing each compensated frame 22c into smaller size blocks 24c and finding for each of the blocks 24c a best matching block 22b in the reference frame 22b, which represents the previously coded frame. Traditional video coding standards (H.261, H.263 profile 0, MPEG-2) are block based and consider only a 16×16 block size. More recent video coding standards use more than one block 24 size in motion estimation and compensation. For example, H.263 Profile 3 and MPEG-4 make use of both 16×16 and 8×8 block sizes. Other emerging video coding standards offer an even wider selection of block sizes in motion estimation/compensation, for example, the H.264 video coding standard allows for 16×16, 16×8, 8×16, 8×8, 8×4, 4×8 and 4×4 block 24 sizes. The present brightness compensation algorithm is a pre-processing algorithm. Therefore, the block sizes that could be considered during brightness compensation are not necessarily tied to the block sizes that would be used in motion estimation and compensation. Consequently, the present brightness compensation algorithm could work with a variety of video-coding standards.

Figure 4:
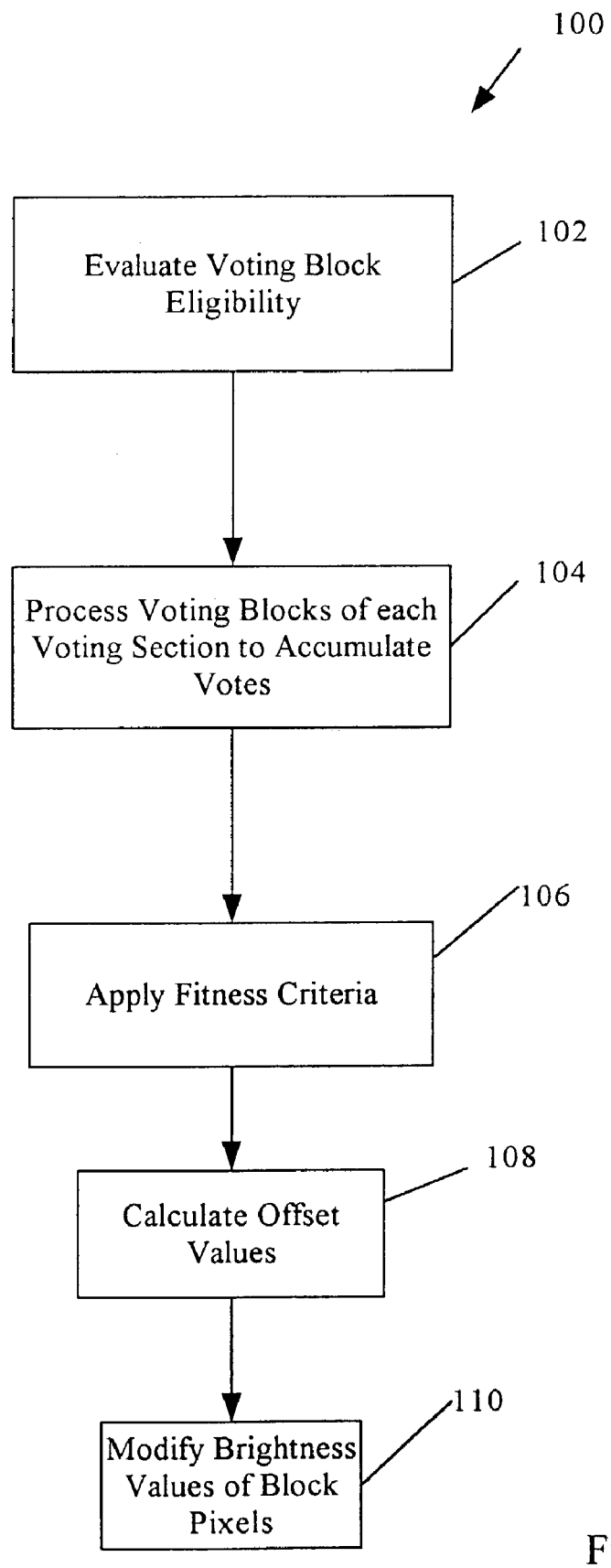
FIG. 4 shows a global brightness change compensation algorithm for the system of FIG. 1.

Referring to FIG. 4, the global brightness change compensation algorithm 100 used by the compensation section 32 (see FIG. 2), which is separate from the encoding process of the compensated Nth source frames 22c done by various components of the encoder 18, evaluates the eligibility 102 of each voting block 24a in the frame 22a to vote for a set of brightness change model parameters, as further explained below. For each voting section VS, the algorithm 100 processes eligible voting blocks 24a using a brightness model to accumulate 104 votes for each possible set of brightness model parameters. The brightness change model, further described below, should be suitable for quantifying the brightness change between two frames 22a. The algorithm 100 then uses a set of fitness criteria 106 to select the most suitable parameter set from the possible parameter sets. The compensation section 32 then uses the suitable parameter set for a given voting section VS to calculate a particular brightness offset value 108 for each pixel in the voting section VS. It is recognised that the set of suitable parameters for the brightness change model may be different for each of the voting sections VS. The compensation section 32 then applies 110, for each pixel in the respective voting section VS, the calculated offset value 108 to adjust the pixel's brightness level, thereby producing the compensated frame 22c (see FIG. 2).

Referring to FIG. 4, each voting block 24a is examined for eligibility 102 to vote for a particular parameter set for the brightness change model. The purpose of examining the eligibility 102 to vote is to eliminate as many as possible the blocks 24a that would likely be undergoing motion and therefore would bias the voting process to correct brightness changes in the source frame 24a, since the changes that such motion blocks 24a would exhibit would be mostly due to motion and not to actual brightness changes. The eligibility 102 to vote could for example be determined by examining the way the co-located voting blocks 24a in a number of previous frames 22a have been coded. If for example, the co-located voting block 24a in the previous frame 22a under consideration was coded using the Intra mode, or has a motion vector different from (0, 0), then the voting block 24a would be deemed not eligible 102 to vote. Otherwise, the voting block 24a under consideration would be eligible 102 to vote. It is recognised that other forms of voting eligibility 102 could be used, or the eligibility 102 step could be omitted by the global brightness change compensation algorithm 100 for predefined types of video data 12 and/or block 24a types.

One embodiment of the brightness change model is such as but not limited to the following model $$I_{source}(t) = C \times I_{previous}(t-1) + D$$

where $I_{source}(t)$ is the average luminance value of the voting block 24a in the source frame t, $I^{previous}(t-1)$ is the average luminance value of the voting block 24a,b in the previous compensated source frame t−1 or in the reference frame t−1, C is contrast change and D is a brightness shift. For a given voting block 24a, the (C, D) parameter pairs that represent the brightness change according to the brightness change model described by the equation above are referred to as candidate (C, D) pairs. It is recognised that other brightness models and corresponding brightness parameter sets could be used, if desired.

Figure 5:
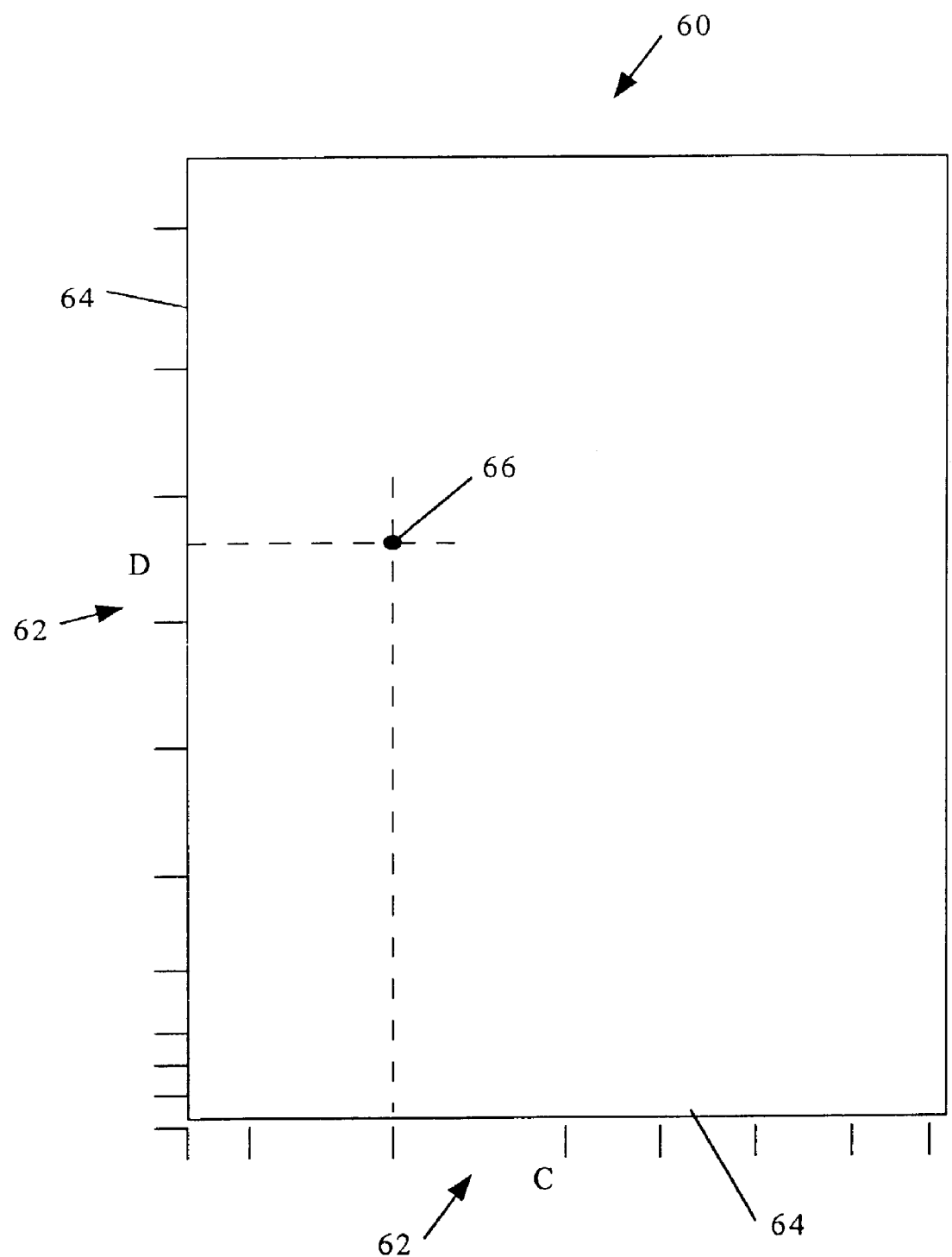
FIG. 5 is an example brightness parameter plane for a model of the algorithm of FIG. 4.

Referring to FIGS. 4 and 5, for each new frame 22a, and before the voting starts, the following steps are performed for the Hough Transform; a range of possible parameter C and D values is selected to define a C, D plane 60, and a set of discrete C and D values 62 within the defined range of C and D values is determined. The distribution of the discrete C,D values 62 along the respective C and D axes 64 of the C,D plane 60 may be dependent on the type of video data 12.

Then, the accumulation 104 of votes by the algorithm 100 for the C and D values, using the Hough Transform, could be done for example by performing the following operations for each voting section VS in the frame 22a; for each eligible voting block 24a in the particular voting section VS, select a predetermined number of discrete C values 62 in the set of acceptable discrete C values 64, and calculate corresponding discrete D values 62 using the brightness change model. This is possible since the $I_{source}(t)$ and $I_{previous}(t-1)$ values are known from the pixel values for the blocks 24a of the source 22a, and the blocks, of the reference frame 22b or the previous brightness compensated source frame 22e (i.e. calculate a corresponding D value knowing the value of the remaining variables in the brightness change model). The resulting value of D is then set to the closest discrete D value in the defined range for the D parameter.

For each Candidate (C, D) Pair 66, the total number of votes accumulated 104 so far from the current voting section VS and all previous voting sections VS is increased. For example, for each Candidate (C, D) pair 66, two votes would be added to the total number of votes that have been accumulated so far from the current voting section VS and all previous voting sections VS for the Candidate (C, D) pair. For the (C, D) pairs in the (C, D) plane 60 that are located immediately to the top, right, bottom and left of any Candidate (C, D) Pair 66, one vote is added to the total number of votes accumulated so far from the current voting section VS and all previous voting sections VS For any given voting block, any given discrete C value would result in a Candidate (C, D) pair for the voting block. Therefore, for each voting block, there should be as many Candidate (C, D) pairs as the number of discrete C values. The total number of votes for the identified (C,D) pair is increased by 2, and the number of votes for each of the (C,D) pairs (not categorized as Candidate (C,D) pairs for the current voting block) located in the (C,D) plane above, to the right, left and at the bottom of the Candidate (C,D) pair is increased by one. Accordingly, different weighting can be associated with different degrees of suitability for the pairs 66. It is recognised that weighting other than the values 1 and 2 could be used if desired, as well as more than two types of (C,D) pairs could be defined with associated weighting.

To speed up the voting process using the Hough Transform, one may choose to localize the voting process around an initial value of the (C, D) parameter pair 66. The initialization of the (C, D) parameter pair 66 for a given voting section VS could be done for example using the Suitable (C, D) pair 66 corresponding to the previous voting section VS of the video data 12. This localized voting could be achieved by limiting the range and number of possible (C, D) pairs 66 to consider to a neighbourhood of the initial (C, D) pair 66 values.

Referring to FIG. 4, once all the votes from a given voting section VS are accumulated 104, the selection of a (C, D) pair to be used in brightness change compensation is performed according to the fitness criteria 106, and the selected (C, D) pair is referred to as a Suitable (C, D) pair. Examples of fitness criteria 106 are such as but not limited to include performing the following checks:

1. at the end of processing the votes from any given voting section VS, the number of votes accumulated 104 based on processing all the eligible voting blocks 24a so far in the frame 22a would be greater than a given threshold. The threshold could, for example, be made a function of the total number of eligible votes that have been accounted for so far in the frame 22a;

2. for a given (C, D) pair that meets condition 1 above, the number of voting blocks 24a where the absolute value of the intensity prediction error $predictionerror(t) = I_{source}(t) - C \times I_{previous}(t-1) - D$ for the voting block 24a is less than a pre-specified threshold, is greater than a minimum threshold;

3. if it turns out that more than one (C, D) pair meet conditions 1 and 2 above, the most suitable pair to choose, to be referred to as the Suitable (C, D) Pair, could be determined based on additional criteria such as for example the number of accumulated votes in the Hough Transform.

Therefore, according to the above, a particular Suitable (C, D) pair is chosen for each voting section VS through the fitness criteria 106, where it is considered that each voting section VS may have a different Suitable (C,D) pair value. Therefore, each (C,D) pair is examined to see if it meets conditions 1 and 2. If more than one (C,D) pair meet conditions 1 and 2 are identified, then condition 3 is used to select the Suitable (C,D) pair.

Referring to FIG. 4, in any given voting section VS, compensation of the brightness values 110 could be performed on blocks 24a that may differ in size from the voting blocks 24a in that voting section VS. Once a suitable (C, D) Pair has been selected, compensation 110 for any detected global brightness change could take place by performing the following operations for each block 24a to be compensated: first computing the offset 108 such as but not limited to by the offset model $Offset(t) = C \times I_{previous}(t-1) + D - I_{previous}(t-1);$ and then adjusting the average luminance value for the block 24a to be compensated by subtracting the offset Offset(t) for the block 24a to be compensated from the luminance value for each pixel in the block 24a to be compensated, thereby resulting in the compensated block 24c.

The above proposed adjustment of brightness aims at removing brightness changes from the source frame 22a so that the resulting brightness compensated frame 22c would have a brightness level that is similar to that in the previously brightness compensated source frame 22e or as that of the reference frame 22b. In some situations it is desired to simply smooth out the brightness level changes in the source frame 22a. In such cases, it would be necessary to slowly bring the brightness level in the brightness compensated source frame 22e close to that in the source frame 22a. To achieve such gradual change in brightness, only a fraction of the brightness offset would be used in the compensation to produce the compensated frame 22c, as opposed to using the all of the offset value computed above.

It is recognised that compensation 110 for global brightness changes for adjacent voting sections VS within a given frame 24a would most likely be done using a different Suitable (C, D) Pair for each of the adjacent voting sections VS. Hence, blocks 24a that are located at a boundary separating adjacent voting sections VS would be compensated differently. It follows that an edge artifact may appear in the compensated frame 22c at the boundaries of adjacent voting sections VS in the form of sharp discontinuities. This problem could be alleviated by smoothing or otherwise filtering the transition in brightness compensation 110 between adjacent voting sections VS, using for example filtered values of (C, D) parameters where filtering is intended to smooth the transition between the (C, D) parameter pairs used in adjacent Voting Sections VS. The smoothing of the transition in brightness compensation could be performed, for example, by compensating the voting blocks 24a closest to the boundary with a (C, D) Pair that is close to the Suitable (C, D) Pair values for the adjacent voting section(s) VS, where adjacent VS could mean for example the VS on top, below or to the side of the current VS, and gradually increasing the (C, D) values in such a way that the voting blocks 24a in the current voting section VS that are the farthest away from the boundaries with the adjacent voting sections VS are compensated using the Suitable (C, D) Pair that was supposed to be used with all the voting blocks 24a in the current voting section VS. It is recognised that the boundary between voting sections VS could be oriented as a horizontal boundary or a vertical boundary in the frame 22a.

An example of compensation for global brightness change with filtering is described in the following. Assume the frame 22a is divided into voting sections VS where each voting section VS is represented by a row of 16×16 blocks. Assume the voting blocks have the same size in all the voting sections VS. Assume also that brightness compensation is performed starting with the top voting section VS in the frame 22a and then moving down to the next voting sections VS. Let (C_top, D_top) denote the Suitable (C, D) Pair for the voting section VS on top on the current voting section VS. Let (C_current, D_current) denote the Suitable (C, D) Pair for the current Voting Section. Let N_rows denote the number of rows of voting blocks 24a within the current voting section VS. Let Delta_C=(C_top−C_current)/N_rows and Delta_D=(D_top−D_current)/N_rows. Then for all voting sections VS other than the top voting section VS, the compensation for brightness change could be performed as follows for the blocks 24a of the voting sections VS that are positioned below the boundary between the voting sections VS:

1. Set C_old=C_top
2. Set D_old=D_top
3. Set Counter=1
4. Set C_new=C_old−Delta_C
5. Set D_new=D_old−Delta_D
6. For all voting blocks 24a in the row number Counter of voting blocks 24a
   a. Compute the offset based on the pair (C_new, D_new) as in (3)
   b. Adjust the luminance value for each pixel in the voting block 24a by subtracting the offset for the voting block 24a from the luminance value for each pixel in the voting block 24a.
7. C_old=C_new
8. D_old=D_new
9. counter=counter+1
10. If counter>N_rows then exit, otherwise go to step 4

The global brightness change compensation algorithm 100 could be tailored to provide different levels of processing delays. The processing delay can be represented by a minimum size of the voting section VS that is needed by algorithm 100 to produce a Suitable (C, D) Pair used to perform brightness change compensation by the compensation section 32 to produce the first compensated macroblock 24c in the compensated frame 22c. The algorithm 100 could for example be tailored to provide one-frame processing delay, one-slice processing delay, or one-macroblock processing delay. These examples are discussed in more detail in the following sections.

Figure 6:
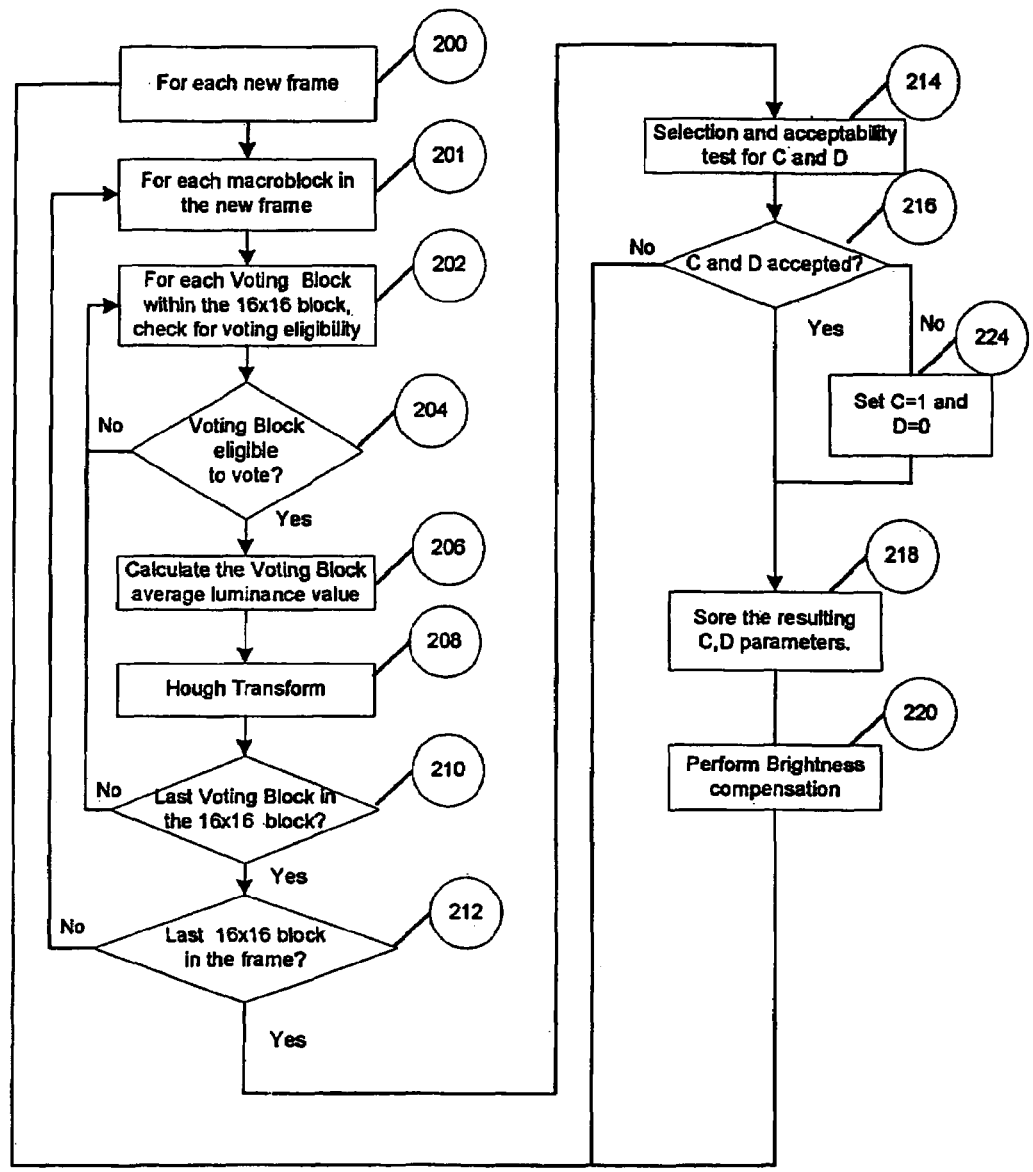
FIG. 6 is a method for one-frame processing delay by the algorithm of FIG. 4.

In the case of a one-frame processing delay, the votes from all the eligible voting blocks 24a in the whole frame 22a are processed by the Hough Transform before a Suitable (C, D) Pair is produced and the first voting block 24a is compensated to produce the compensated block 24c. Referring to FIG. 6, the following steps are performed for each 200 new frame 22a: step 201, for each macroblock in the frame, and step 202, for each voting block within the macroblock, perform the following check 204 to check the Voting Block eligibility to vote, and if the voting block is eligible to vote, then process 206 the voting block through the Hough transform 208. The last voting block 24a in the macroblock is done 210 and then the last macroblock in the frame 22a is done 212 as above. Once completed, then the step 214 is performed to determine a Suitable (C, D) Pair, if none could be determined then set 224 C=1 and D=0. Once the C and D values a perform 220 brightness change compensation to produce all blocks 24c of the compensated frame 22c, and then start processing the next frame. This is repeated for each new frame 22a. The stored (C, D) value could be used to initialize the search for a Suitable (C, D) Pair for the next frame to be processed.

Figure 7:
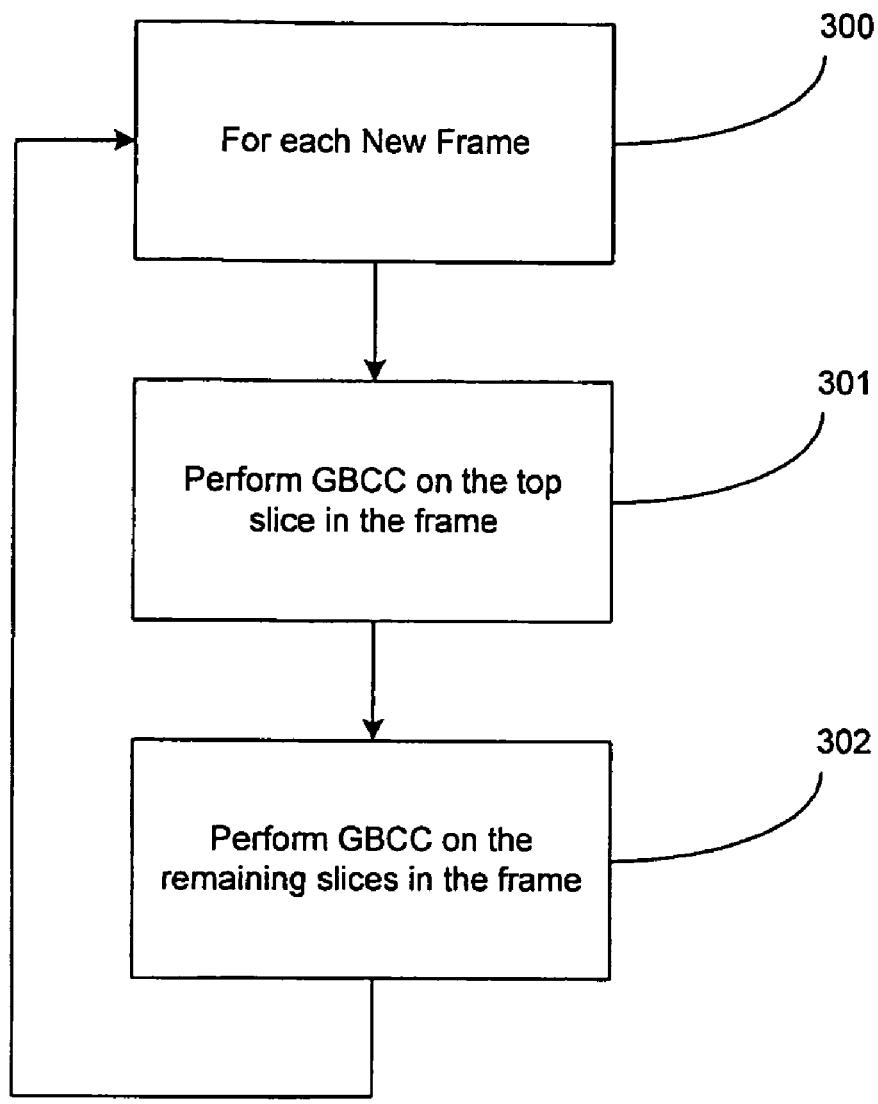
FIG. 7 is a method for one-slice processing delay by the algorithm of FIG. 4.
Figure 8:
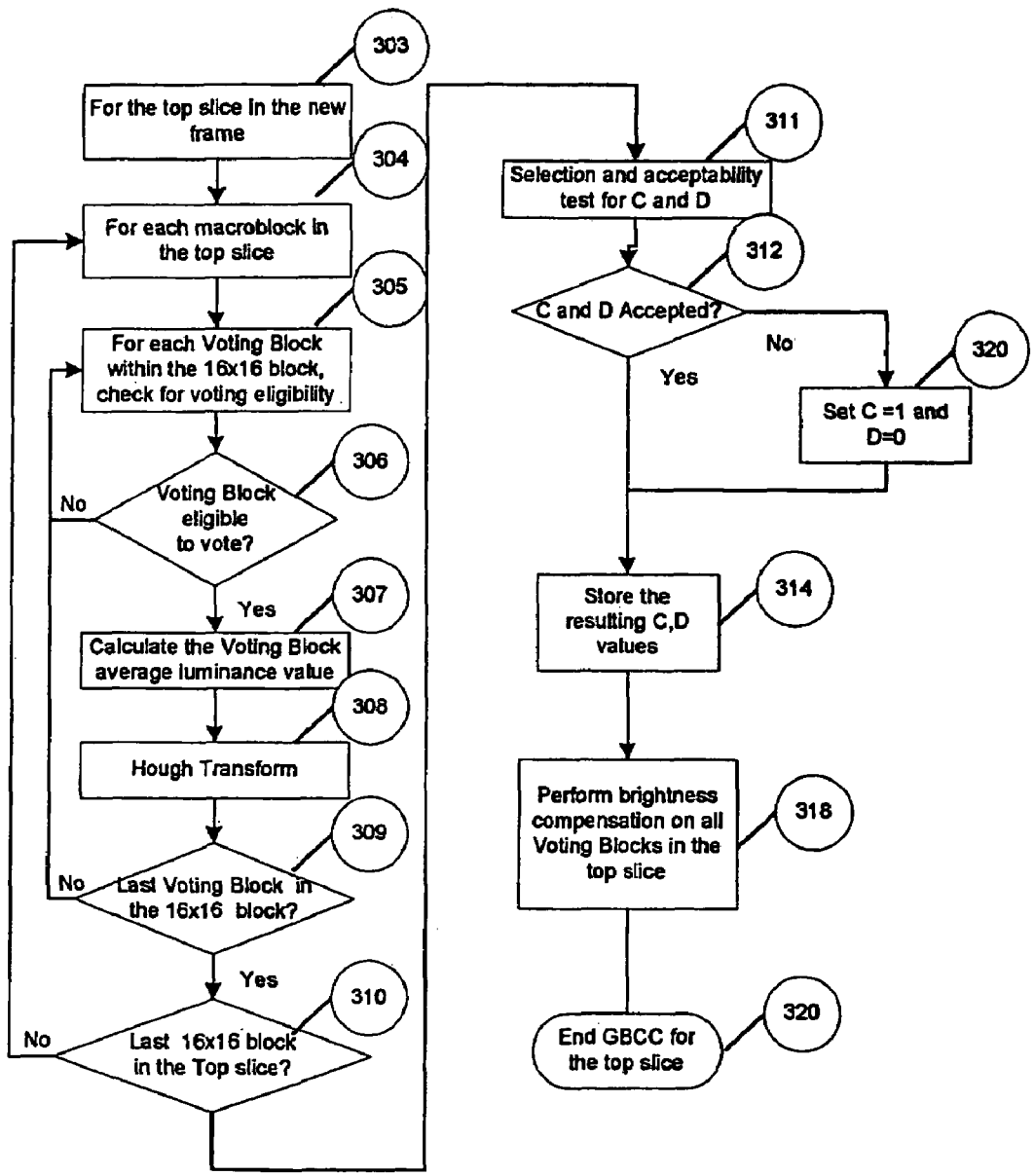
FIG. 8 shows further details of the method of FIG. 7.
Figure 9:
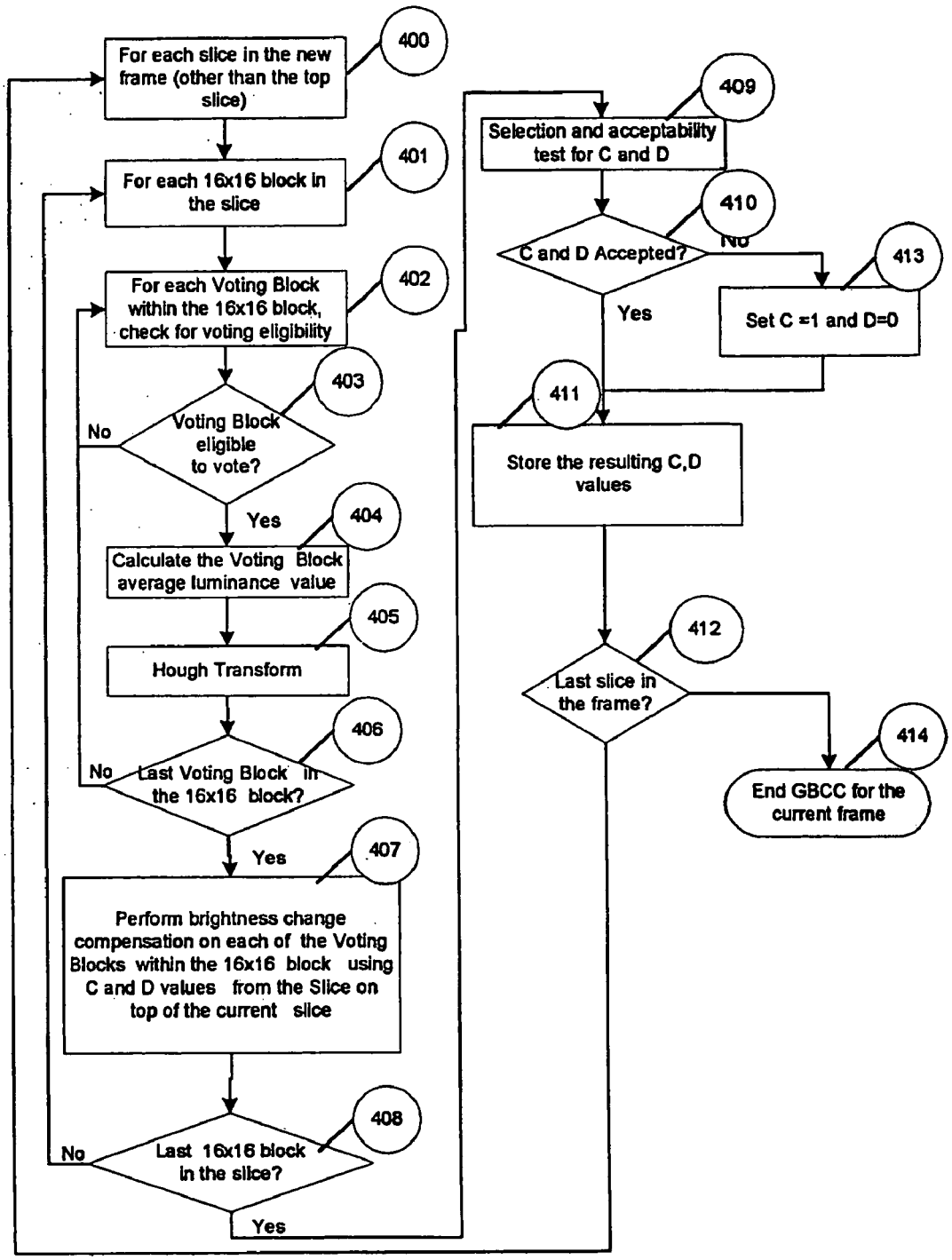
FIG. 9 shows further details of the method of FIG. 7.
Figure 10:
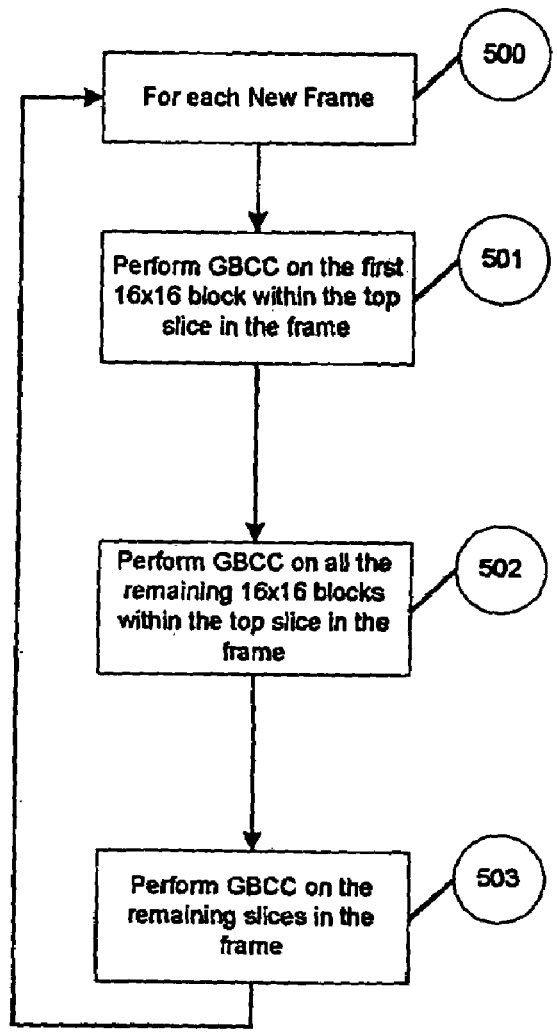
FIG. 10 is a method for one-macroblock processing delay by the algorithm of FIG. 4.

Referring to FIGS. 7, 8, and 9, in the case of a one-slice processing delay, the votes from all the eligible voting blocks 24a in the first slice of the frame 22a have to be processed by the Hough Transform before a Suitable (C, D) pair is produced and the first voting block 24a is compensated. The overall process is such that for each 300 new frame 22a, the brightness compensation is performed 301 on the top slice of the frame 22a and then the remaining slices are compensated 302.

Referring to FIG. 8, the following steps are performed for each frame 22a. Step 303 for the first slice in the frame 22a, and step 304 for each macroblock in the first slice, and for step 305 for each voting block within the macroblock, first check 306 the Voting Block eligibility to vote. If the voting block is eligible to vote, then process 307 the voting block through the Hough transform 308. The last voting block 24a in the macroblock is done 309 and then the last macroblock in the slice is done 310 as above. Once completed, then the steps are performed of determine 311 a Suitable (C, D) Pair for the first slice, if any exists 312. If no Suitable (C, D) Pair for the first slice exists 312, then set the C,D pair to the default values 320. The following steps are then performed: store 314 the resulting (C, D), perform 318 global brightness Change Compensation using the Stored (C, D) Pair on all Voting Blocks in the first slice and then end 320 the compensation for the first slice.

Referring to FIG. 9, for all 400 the slices in the frame 22a (other than the first slice), and for each 401 macroblock in the slice, and for each 402 voting block within the macroblock, the following steps are performed. Step 403, check the Voting Block eligibility to vote. If the voting block is eligible to vote, then process 404 the voting block through the Hough transform 405. Once 406 all the Voting Blocks in the macroblock are processed, then the Global Brightness Change Compensation is performed 407 with filtering using the Suitable (C, D) Pair corresponding to the slice on top of the current slice. The same process described above is repeated for the remaining macroblocks in the slice under consideration. The last macroblock in the slice is done 408. Once completed, then the steps are performed of determine 409 a Suitable (C, D) Pair for the slice under consideration, if any exists 410. If no Suitable (C, D) Pair for the slice under consideration could be identified, then set 413 the C, D pair to default values. Then store 411 the resulting suitable (C, D) Pair. The same process described above is repeated for the remaining slices in the frame under consideration. The last slice is done in 414 and the whole frame is done 414.

In the case of a one-macroblock processing delay, the votes from all the eligible Voting Blocks in the first macroblock in the frame have to be processed by the Hough Transform before a Suitable (C, D) pair is produced and the first Voting Block is compensated. Referring to FIGS. 10, 11, 12, and 13, for each 500 new frame 22a, perform 501 the brightness compensation on the first macroblock, then on all the remaining 502 macroblocks in the top slice in the frame, then perform 503 the brightness compensation on the remaining 503 slices in the frame 22a.

Figure 11:
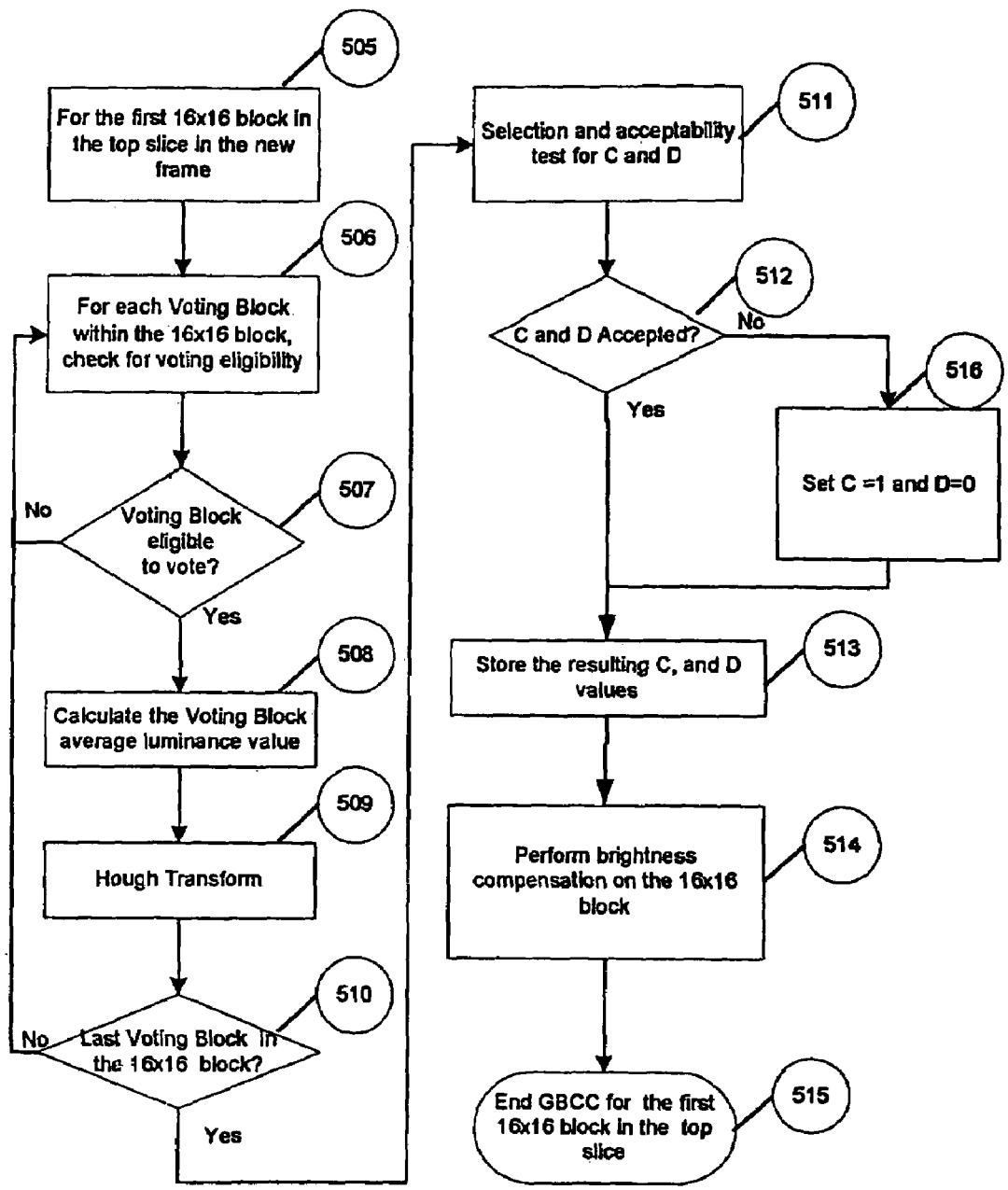
FIG. 11 shows further details of the method of FIG. 10.

Referring to FIG. 11 for the one-macroblock processing delay, for the first slice in the frame, step 505 for the first macroblock in the first slice in the frame, and step 506 for each voting block within the macroblock, the following steps are performed. Check 507 the voting block eligibility to vote. If the voting block is eligible to vote, then process 508 the voting block through the Hough transform 509. If it is the last 510 voting block, determine 511 a Suitable (C, D) Pair for the macroblock, if any exists 512. If no Suitable (C, D) Pair for the first slice exists 512, then set the C,D pair to default values 516. Store 513 the resulting (C, D) pair and perform 514 brightness change compensation on the first macroblock. Step 515 ends the compensation for the first macroblock in the top slice of the frame 22a.

Figure 12:
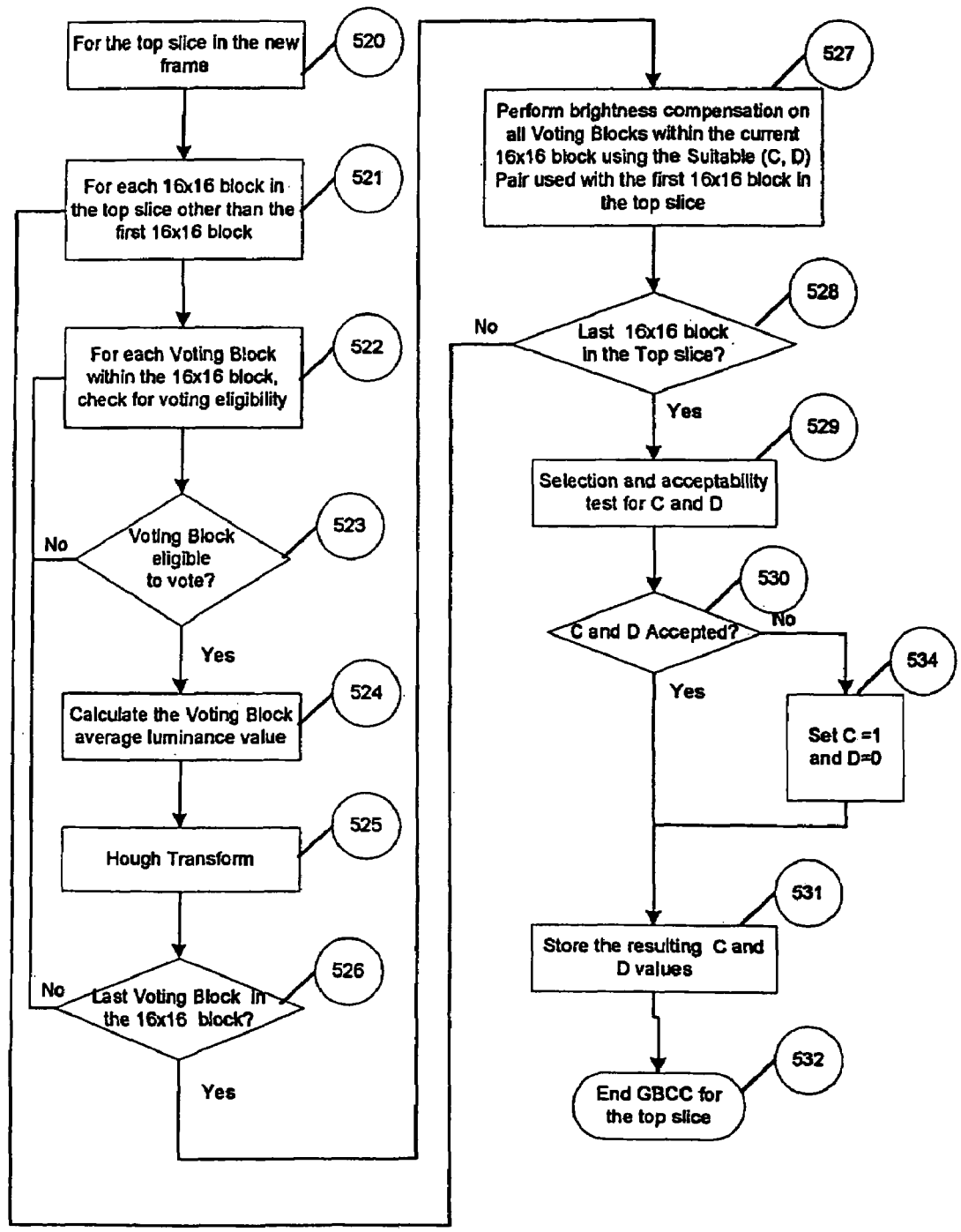
FIG. 12 shows further details of the method of FIG. 10.

Referring to FIG. 12, for 520 the top slice in the new frame 22a, for all 521 the macroblocks in the first slice (other than the first macroblock), and for 522 each voting block within the macroblock, the following steps are performed. Step 523, check the Voting Block eligibility to vote. If the voting block is eligible to vote, then process 524 the voting block through the Hough Transform 525. Once 526 all the Voting Blocks in the macroblock are processed, then perform 527 the Global Brightness Change Compensation with filtering using the Suitable (C, D) Pair corresponding to the first macroblock in the top slice. If 528 the macroblock is the last macroblock in the top slice, then determine 529 a Suitable (C, D) Pair for the first slice, if any exists 530. However, if no Suitable (C, D) Pair for the first slice exists 530, then set the C,D pair to default values 534. Store 531 the resulting (C, D) pair and end 532 the compensation for the top slice.

Figure 13:
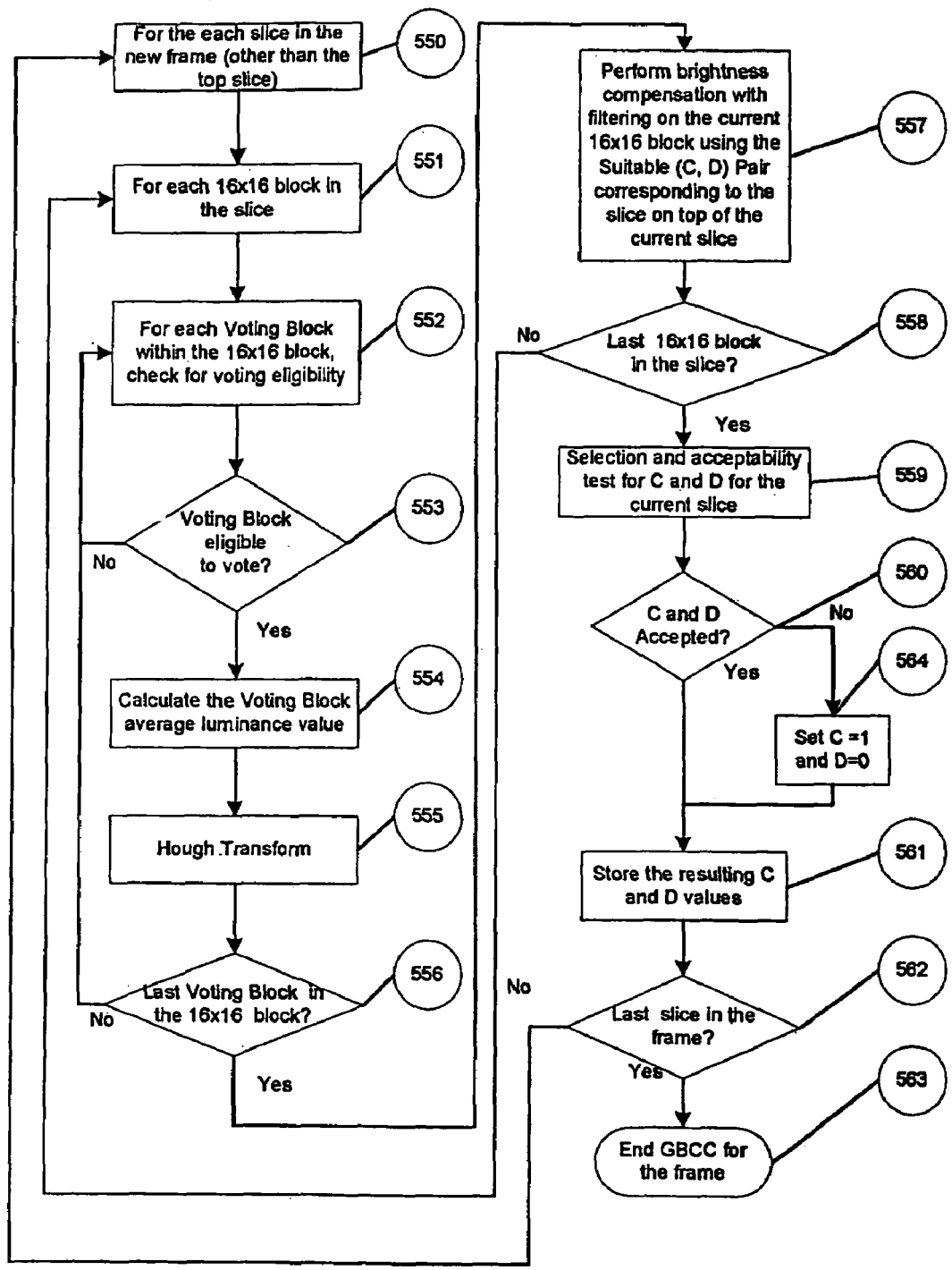
FIG. 13 shows further details of the method of FIG. 10.

Referring to FIG. 13, for 550 all the slices in the frame (other than the first slice), and for 551 each macroblock in the slice, and for each 552 voting block within the macroblock, the following steps are performed. Step 553, check the Voting Block eligibility to vote. If the voting block is eligible to vote, then process 554 the voting block through the Hough transform 555. Once 556 all the Voting Blocks in the macroblock are processed, then perform 557 the Global Brightness Change Compensation with filtering using the Suitable (C, D) Pair corresponding to the slice on top of the current slice. Once the last macroblock in the slice 558 is processed, determine 559 a Suitable (C, D) Pair for the current slice, if any exists 560. If no Suitable (C, D) Pair for the first slice exists 560, then set the C,D pair to default values 564. Store 561 the resulting (C, D) pair. When all the slices in the current frame have been processed 562, then end the brightness change compensation for the current frame, otherwise continue to the next slice in the frame.

In summary, the algorithm 100 provides for compensation for global brightness changes between successive frames in the video frame sequence, as a pre-processing approach prior to motion prediction by the motion section 36, see FIG. 2. The algorithm has two main components, namely describing the brightness change between two successive frames 22a through brightness parameters (e.g. C,D), and providing the means to remove or modify any detected brightness changes while minimizing visual artifacts that might arise out of the brightness change compensation. The brightness change model describing the brightness change between two successive frames 22a is identified using the Hough transform and model fitness criteria, where the Hough transform may process only voting blocks that are considered eligible to vote. The identified brightness change model is then used to determine the level of compensation for each pixel in the source frame, and where filtering of the model parameter pairs (C, D) corresponding to adjacent voting sections is used when needed to help avoid artifacts that might arise out of the brightness compensation. Further, the above-mentioned steps can be re-arranged in the algorithm 100 to provide different processing delay options, shown as examples. Further, the brightness levels of the Nth source frame 22a are matched through the brightness offset as compared to the previously compensated source frame 22e, or to the reference frame 22b.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A pre-processing system for reducing identified brightness changes between a first video source frame and a subsequent second video source frame in a video frame sequence, the system comprising:
   a) an input for the video frame sequence, the sequence including the second source frame having an array of second source pixels;
   b) a frame memory for containing a first brightness compensated frame representing a brightness compensated version of the first source frame, the first compensated frame having an array of brightness compensated first pixels;
   c) a brightness pre-processor having a brightness model with at least two model parameters for identifying a brightness variation between a selected group of the second source pixels and a corresponding selected group of the compensated pixels;
   d) a brightness filter for selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, thereby producing a second brightness compensated source frame;
   wherein the reduction of the brightness variation between the second source frame and the first compensated frame provides the second brightness compensated source frame for input to an encoder.

2. The pre-processing system according to claim 1, wherein the groups of pixels are represented by voting blocks.

3. The pre-processing system according to claim 2, wherein a selected group of the voting blocks is arranged as at least two voting sections.

4. The pre-processing system according to claim 2 further comprising an eligibility selector for evaluating the voting ability by predefined fitness criteria of each of the voting blocks to vote for the suitable set of the model parameters.

5. The pre-processing system according to claim 4, wherein the evaluation of each of the voting blocks uses spatial and temporal information.

6. The pre-processing system according to claim 5, wherein the information is used to determine if any collocated blocks of the voting blocks in a set of previous frames were coded in Intra mode or in Inter mode with a motion vector different from (0, 0).

7. The pre-processing system according to claim 2, wherein a Hough Transform is used to accumulate votes from each of the voting blocks.

8. The pre-processing system according to claim 7, wherein the model parameters are a contrast change parameter and a brightness shift parameter.

9. The pre-processing system according to claim 7, wherein the brightness filter accumulates the votes from the voting blocks of each of the voting sections for determining the suitable set of the model parameters for each of the voting sections for calculating the brightness offset.

10. The pre-processing system according to claim 4, wherein the fitness criteria are used to identify among all possible model parameter sets, the suitable parameter set for each group of source pixels to optimally representing the brightness variation for that pixel group.

11. The pre-processing system according to claim 1, wherein the first brightness compensated frame is a previously compensated first source frame from a pre-processor.

12. The pre-processing system according to claim 1, wherein the first brightness compensated frame is a reconstructed frame from the encoder corresponding to the previous first source frame.

13. The pre-processing system according to claim 2 further comprising a delay section to provide multiple levels of processing delays for selecting the suitable parameter set and applying the calculated brightness offset.

14. The pre-processing system according to claim 13, wherein the processing delays are selected from the group comprising; a one-frame processing delay, a one-slice processing delay, and a one-macroblock processing delay.

15. The pre-processing system according to claim 14, wherein the one-frame processing delay selects the suitable parameter set for all the voting blocks in the second source frame using the brightness model before any of the voting blocks in the second source frame are compensated using the appropriate brightness offset.

16. The pre-processing system according to claim 14, wherein the one slice processing delay selects the suitable parameter set for all the voting blocks in a top voting section of the second source frame before any of the voting blocks in the voting section are compensated using the appropriate brightness offset.

17. The pre-processing system according to claim 14, wherein the one macroblock-processing delay selects the suitable parameter set for all the voting blocks in a first macroblock in a top voting section of the second source frame before any of the voting blocks in the macroblock are compensated using the appropriate brightness offset.

18. The pre-processing system according to claim 16, wherein the top voting section is a slice in the second source frame.

19. The pre-processing system according to claim 17, wherein the top voting section is a slice in the second source frame.

20. The pre-processing system according to claim 1, wherein only a portion of the brightness offset is used by the brightness filter to control the degree or modification to the identified brightness of the second source frame.

21. A pre-processing method for reducing identified brightness changes between a first video source frame and a subsequent second video source frame in a video frame sequence, the method comprising:
   a) receiving the video frame sequence, the sequence including the second source frame having an array of second source pixels;
   b) storing a first brightness compensated frame representing a brightness compensated version of the first source frame, the first compensated frame having an array of brightness compensated first pixels;
   c) pre-processing the second source frame using a brightness model with at least two model parameters to identify a brightness variation between a selected group of the second source pixels and a corresponding selected group of the compensated pixels;
   d) identifying the brightness of the second source frame by selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, and
   e) producing a second brightness compensated source frame by applying the brightness offset to the second source frame;
   wherein the reduction of the brightness variation between the second source frame and the first compensated frame provides the second brightness compensated source frame for input to an encoder.

22. A computer program product for video frame pre-processing to reduce identified brightness changes between a first video source frame and a subsequent second video source frame in a video frame sequence, the computer program product comprising:
   a) a computer readable medium;
   b) an input module stored on the computer readable medium for storing the video frame sequence, the sequence including the second source frame having an array of second source pixels;
   c) a frame memory module coupled to the input module, the memory module for containing a first brightness compensated frame representing a brightness compensated version of the first source frame, the first compensated frame having an array of brightness compensated first pixels;
   d) a brightness pre-processor module coupled to the frame module, the pre-processor module having a brightness model with at least two model parameters for identifying a brightness variation between a selected group of the second source pixels and a corresponding selected group of the compensated pixels;
   e) a brightness filter module coupled to the pre-processor module, the filter module for selecting a suitable set of the model parameters for each group of the second source pixels and compensated pixels, the suitable parameter set used to calculate a brightness offset for reducing the identified brightness variation from the group of second source pixels to more closely correspond to the brightness level of the compensated pixels, thereby producing a second brightness compensated source frame;
   wherein the reduction of the brightness variation between the second source frame and the first compensated frame provides the second brightness compensated source frame for input to an encoder.

* * * * *